(12) United States Patent
Wake

(10) Patent No.: US 7,548,695 B2
(45) Date of Patent: Jun. 16, 2009

(54) WIRELESS SIGNAL DISTRIBUTION SYSTEM AND METHOD

(75) Inventor: David Wake, Ipswich (GB)

(73) Assignee: NEXTG Networks, Inc., San Jose, CA (US)

(*) Notice: Subject to any disclaimer, the term of this patent is extended or adjusted under 35 U.S.C. 154(b) by 2 days.

(21) Appl. No.: 10/969,294

(22) Filed: Oct. 19, 2004

(65) Prior Publication Data
US 2006/0083512 A1    Apr. 20, 2006

(51) Int. Cl.
*H04J 14/00* (2006.01)

(52) U.S. Cl. ............... 398/71; 398/59; 398/66; 398/67; 398/75

(58) Field of Classification Search ............ 398/58, 398/59, 66, 68–75
See application file for complete search history.

(56) References Cited

U.S. PATENT DOCUMENTS

| | | | | |
|---|---|---|---|---|
| 5,278,690 A * | 1/1994 | Vella-Coleiro | ............ | 398/139 |
| 5,600,466 A * | 2/1997 | Tsushima et al. | ............ | 398/79 |
| 5,627,879 A | 5/1997 | Russell et al. | | |
| 5,682,256 A | 10/1997 | Motley et al. | | |
| 5,717,795 A * | 2/1998 | Sharma et al. | ............ | 385/24 |
| 5,764,826 A * | 6/1998 | Kuhara et al. | ............ | 385/24 |
| 5,880,863 A * | 3/1999 | Rideout et al. | ............ | 398/59 |
| 5,940,196 A * | 8/1999 | Piehler et al. | ............ | 398/91 |
| 6,064,377 A * | 5/2000 | Hoarty et al. | ............ | 715/716 |
| 6,112,093 A * | 8/2000 | Nordlund | ............ | 455/450 |
| 6,243,175 B1* | 6/2001 | Pelekhaty | ............ | 398/9 |
| 6,424,840 B1* | 7/2002 | Fitch et al. | ............ | 455/456.1 |
| 6,751,417 B1* | 6/2004 | Combs et al. | ............ | 398/71 |
| 6,785,558 B1* | 8/2004 | Stratford et al. | ............ | 455/561 |
| 6,801,767 B1* | 10/2004 | Schwartz et al. | ............ | 455/426.2 |
| 6,826,163 B2* | 11/2004 | Mani et al. | ............ | 370/334 |
| 6,885,821 B2* | 4/2005 | Cooney et al. | ............ | 398/45 |
| 6,892,032 B2* | 5/2005 | Milton et al. | ............ | 398/79 |
| 6,928,245 B1* | 8/2005 | Li | ............ | 398/79 |
| 6,993,260 B2* | 1/2006 | Byers et al. | ............ | 398/118 |
| 7,013,087 B2* | 3/2006 | Suzuki et al. | ............ | 398/115 |
| 7,016,608 B1* | 3/2006 | Ball et al. | ............ | 398/71 |
| 7,027,733 B2* | 4/2006 | Feuer et al. | ............ | 398/72 |
| 7,203,422 B2* | 4/2007 | Kani et al. | ............ | 398/72 |
| 7,289,732 B2* | 10/2007 | Koh et al. | ............ | 398/75 |

(Continued)

OTHER PUBLICATIONS

"Radio Over Fibre Networks For Mobile Communications" by David Wake et al., SPIE, vol. 5466, 2004 (12 pp).

(Continued)

*Primary Examiner*—Ken N Vanderpuye
*Assistant Examiner*—Danny W Leung
(74) *Attorney, Agent, or Firm*—Vierra Magen Marcus & DeNiro LLP

(57) ABSTRACT

A communications system connects one or more BTS hotels with several remote access nodes on a transmission ring. Each operator has one or more separate optical wavelengths. Signal flow around the ring can either be uni-directional or bi-directional. Each optical wavelength (or wavelength pair) contains the wireless signal traffic for all remote nodes in the ring for the operator using that particular wavelength in digital form. At each node, the incoming signals are electrically demultiplexed and appropriate signals for that node are extracted for conversion to RF. These signals are copied rather than cut so that they are also available at following remote antenna nodes, thereby enabling simulcast operation.

23 Claims, 11 Drawing Sheets

U.S. PATENT DOCUMENTS

| | | | |
|---|---|---|---|
| 2001/0036163 | A1 | 11/2001 | Sabat, Jr. et al. |
| 2002/0003645 | A1* | 1/2002 | Kim et al. ................... 359/145 |
| 2002/0030870 | A1* | 3/2002 | Aburakawa et al. ......... 359/145 |
| 2002/0075906 | A1* | 6/2002 | Cole et al. .................. 370/535 |
| 2002/0186436 | A1* | 12/2002 | Mani et al. .................. 359/145 |
| 2002/0186674 | A1 | 12/2002 | Mani et al. |
| 2002/0187809 | A1 | 12/2002 | Mani et al. |
| 2002/0191250 | A1* | 12/2002 | Graves et al. ............... 359/128 |
| 2003/0002100 | A1 | 1/2003 | Izadpanah |
| 2003/0007214 | A1* | 1/2003 | Aburakawa et al. ......... 359/145 |
| 2003/0023983 | A1* | 1/2003 | Pidgeon et al. ............. 725/121 |
| 2003/0078052 | A1* | 4/2003 | Atias et al. .................. 455/453 |
| 2003/0161637 | A1* | 8/2003 | Yamamoto et al. ........ 398/167.5 |
| 2004/0001719 | A1* | 1/2004 | Sasaki ........................ 398/115 |
| 2004/0017785 | A1* | 1/2004 | Zelst .......................... 370/328 |
| 2004/0037565 | A1* | 2/2004 | Young et al. ................. 398/115 |
| 2004/0096222 | A1* | 5/2004 | Cagenius .................... 398/115 |
| 2004/0106435 | A1* | 6/2004 | Bauman et al. .......... 455/562.1 |
| 2004/0240884 | A1* | 12/2004 | Gumaste et al. ............... 398/59 |
| 2005/0031348 | A1* | 2/2005 | Choi et al. .................... 398/59 |
| 2005/0036787 | A1* | 2/2005 | Lee et al. ...................... 398/72 |
| 2005/0041971 | A1* | 2/2005 | Lee et al. ...................... 398/72 |
| 2005/0054336 | A1* | 3/2005 | Sanding ...................... 455/418 |
| 2005/0141892 | A1* | 6/2005 | Park et al. ..................... 398/71 |
| 2006/0045526 | A1* | 3/2006 | Katayama et al. ............. 398/71 |
| 2006/0067698 | A1* | 3/2006 | Chan et al. .................. 398/141 |

OTHER PUBLICATIONS

Written Opinion for PCT/US2005/037413, dated Jun. 25, 2006.
Search Report for PCT/US2005/037413, dated Jul. 18, 2006.

* cited by examiner

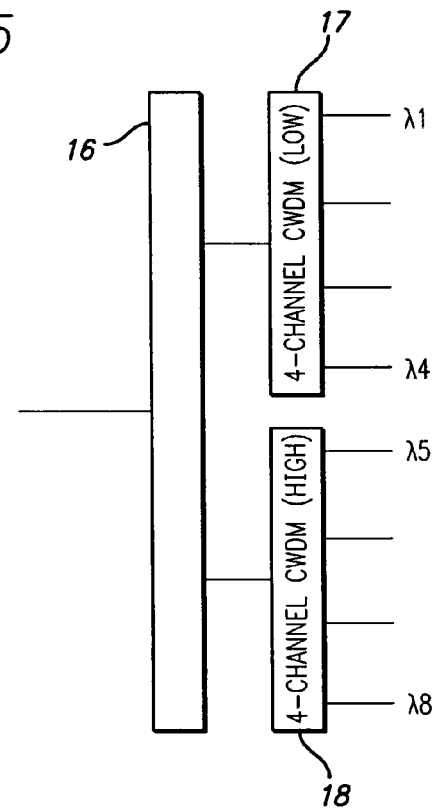
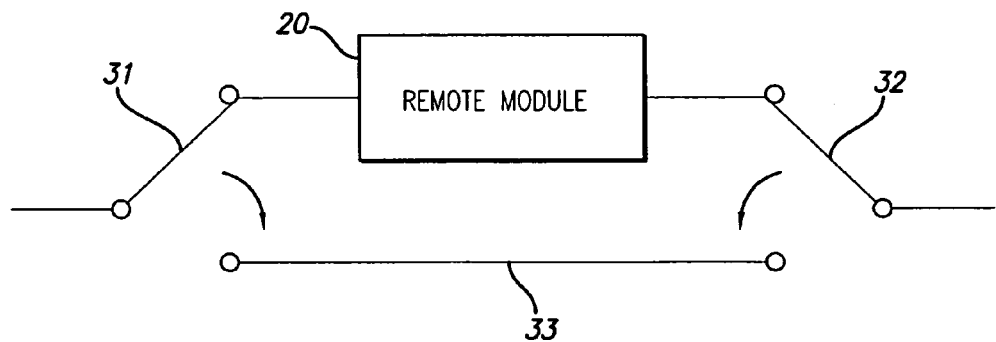

WIRELESS SIGNAL DISTRIBUTION SYSTEM AND METHOD

BACKGROUND OF THE INVENTION

The present invention relates to wireless communications systems and methods and in particular to a signal distribution network for use in these systems.

The basic structure of a conventional wireless network is depicted in FIG. 1. By way of example, the names' given to the various elements of the network shown in FIG. 1 are taken from the Global System for Mobile communications (GSM) standard, which is the most successful and widespread wireless communications system in the world. It must be noted, however, that similar architectures are used with other wireless protocols.

The core network comprises a number of interconnected mobile switching centers (MSC) 1 which have links to a public switched telephone network (PSTN). Each MSC connects to a number of base station controllers (BSC) 2 and each BSC connects to a number of distributed base transceiver stations (BTS) 3. Each BTS is co-located with an antenna 4 which radiates the wireless signals that are generated by the BTSs into free-space. Each BTS provides wireless connectivity to a number of mobile stations (MS) 5 which would commonly be mobile telephones. The coverage area of the wireless network is subdivided into cells 6, each served by a BTS. The link between the BSC and BTS 7 (known as the A-bis interface in GSM), is a baseband digital interface which usually runs on a fiber-optic or microwave radio T1/E1 line.

The wireless signals generated by the BTS comprise a number of channels, each channel being dedicated to a particular MS for the duration of a call. In GSM, the channels are differentiated by a combination of frequency and time. Each frequency, known as a radio carrier, can support up to 8 users on a time division basis. The output of a BTS therefore comprises a number of analog radio carriers, which are radiated by the co-located antenna.

An alternative architecture, as described in U.S. Pat. No. 5,682,256, is depicted in FIG. 2. Here, the BTSs are centralised rather than distributed. In the following text, only the forward link is described (from BTS to MS) for reasons of brevity, although the reverse link (from MS to BTS) is also present. The analog RF outputs from the co-located BTSs are fed into a central RF switch matrix 8. The outputs of the RF switch matrix are connected to a number of optical transceiver units (OTU) 9 which convert the RF signals to optical signals for transmission over optical fiber lines 10. The transmission link is analog in nature and the technique is commonly known as radio-over-fiber. Each antenna site now has a remote antenna unit (RAU) 11 in place of the BTS from FIG. 1. The RAU converts the optical signal from the OTU back into RF form, which is then amplified and radiated from the antenna.

In this architecture, the expensive and complex BTSs are co-located in a benign environment (sometimes known as a BTS hotel), which leads to reduced operational and maintenance costs. Also, the centralization of the radio carriers means that fewer carriers are required for the same grade of service, leading to reduced capital expenditure on BTSs. Furthermore, the RF switch matrix allows capacity to be allocated dynamically, so that fewer still BTSs are needed for situations where capacity demands fluctuate on both a spatial and temporal basis. This type of system can be used in situations where the BTSs belong to more than one network operator, since the switch matrix allows each operator to have their own independent radio plan. A more detailed description of the benefits of this approach can be found in a recent paper by Wake and Beacham, "Radio over fiber networks for mobile communications", Proc. SPIE, vol. 5466, 2004.

U.S. Pat. No. 5,627,879 discloses a centralized BTS network architecture in which the transmission links between the OTUs and RAUs are digital rather than analog. Digital links have a number of advantages over analog links in applications that require high dynamic range, because analog links suffer from an accumulation of noise and distortion. This architecture combines the radio frequency (RF) analog outputs from the BTSs, performs a frequency down-conversion function and then converts the resulting intermediate frequency (IF) signal to digital form using a fast analog-to-digital converter (ADC). This "digital RF" signal is transmitted using conventional digital optical fiber transmission links to the RAUs, where it is converted back to analog form using a fast digital-to-analog converter (DAC) and then upconverted from IF to RF. This re-constituted RF signal is then amplified, filtered and radiated from the antennas.

U.S. Patent publication U.S. 2001/0036163 takes this basic concept and extends it to describe a multi-operator, multi-protocol centralised BTS system. Here, each BTS output is downconverted and digitized using separate ADCs. The digital outputs of the ADCs are multiplexed at the central hub before transmission and are transported to the RAUs using a common transport system. At the RAU the digital signals are demultiplexed and each protocol or operator has an independent "slice module" which translates the resulting signal to RF.

However there are a number of problems with these approaches, in terms of flexibility of service provision and allocation, resilience to failure and transmission efficiency.

BRIEF SUMMARY OF THE INVENTION

The present invention provides a wireless signal distribution network architecture that provides multiple operators with a low-cost and efficient transport platform for multiple protocols with high RF power at the antennas. This architecture is based on the principle that it must also be cost-effective on initial deployment even though it may only support a single operator at that time. The architecture is therefore expandable and scalable, with each operator or protocol having largely separate equipment that can be retrofitted without service disruption to existing operators or protocols.

In one embodiment, the present invention comprises a system that uses a single fiber ring to connect one or more BTS hotels with several remote access nodes. Each operator has one or more separate optical wavelengths in either a coarse or a dense wavelength division multiplex (CWDM or DWDM) architecture, which aids system modularity and expandability. Signal flow around the ring can either be uni-directional or bi-directional, the latter providing resilience to a point failure in the ring. Each optical wavelength (or wavelength pair) contains the wireless signal traffic for all remote nodes in the ring for the operator using that particular wavelength in digital form. At each node the incoming signals are electrically demultiplexed and appropriate signals for that node are extracted for conversion to RF. These signals are copied rather than cut so that they are also available at following remote antenna nodes, thereby enabling simulcast operation.

The present invention further includes a node in a communications system. The node comprises an optical demultiplexer to demultiplex an optical signal received at the node into a plurality of optical channels and an optical multiplexer to multiplex the plurality of optical channels for transmission to a following node. The node also comprises a remote module. The module comprises a photodiode to convert an optical channel from the plurality of optical channels to an electrical signal and an electrical multiplexer/demultiplexer to demultiplex the electrical signal to a plurality of digital electrical channels with at least one digital electrical channel being a transmit channel. The electrical multiplexer/demultiplexer also multiplexes digital electrical channels. The remote module further comprises a converter to convert the transmit channel to an output analog radio frequency signal for transmission and to convert at least one input analog radio frequency signal to at least one digital electrical receive channel to be multiplexed by the electrical multiplexer/demultiplexer onto a multiplexed electrical signal. A laser is used to convert the multiplexed electrical signal to an optical channel to be multiplexed by the optical multiplexer for transmission to the following node. The node can be used in a transmission ring for distributing wireless communications.

The present invention further includes a method for distributing wireless communications employing a single fiber ring to connect one or more BTS hotels with several remote access nodes.

These and other features and advantages of embodiments of the present invention will be apparent to those skilled in the art from the following detailed description of the embodiments of the invention, when read with the drawings and the appended claims.

BRIEF DESCRIPTION OF THE DRAWINGS

FIG. 5 illustrates a two-stage optical multiplexing and demultiplexing process.

FIG. 6 illustrates a mechanism for providing resilience in the event of a remote module failure.

DETAILED DESCRIPTION OF THE INVENTION

In the following description of embodiments, reference is made to accompanying drawings which form a part hereof and in which is shown by way of illustration specific embodiments in which the invention may be practiced. It is to be understood that other embodiments may be utilized and structural changes may be made without departing from the scope of the preferred embodiments of the present invention.

Each of the embodiments discussed below describes a system with transmit, Tx, (forward link), receive, Rx, (reverse link) and receive diversity, RxD, signals. Other situations may also exist, such as systems with no receive diversity or with the addition of transmit diversity (TxD).

Figure 1:
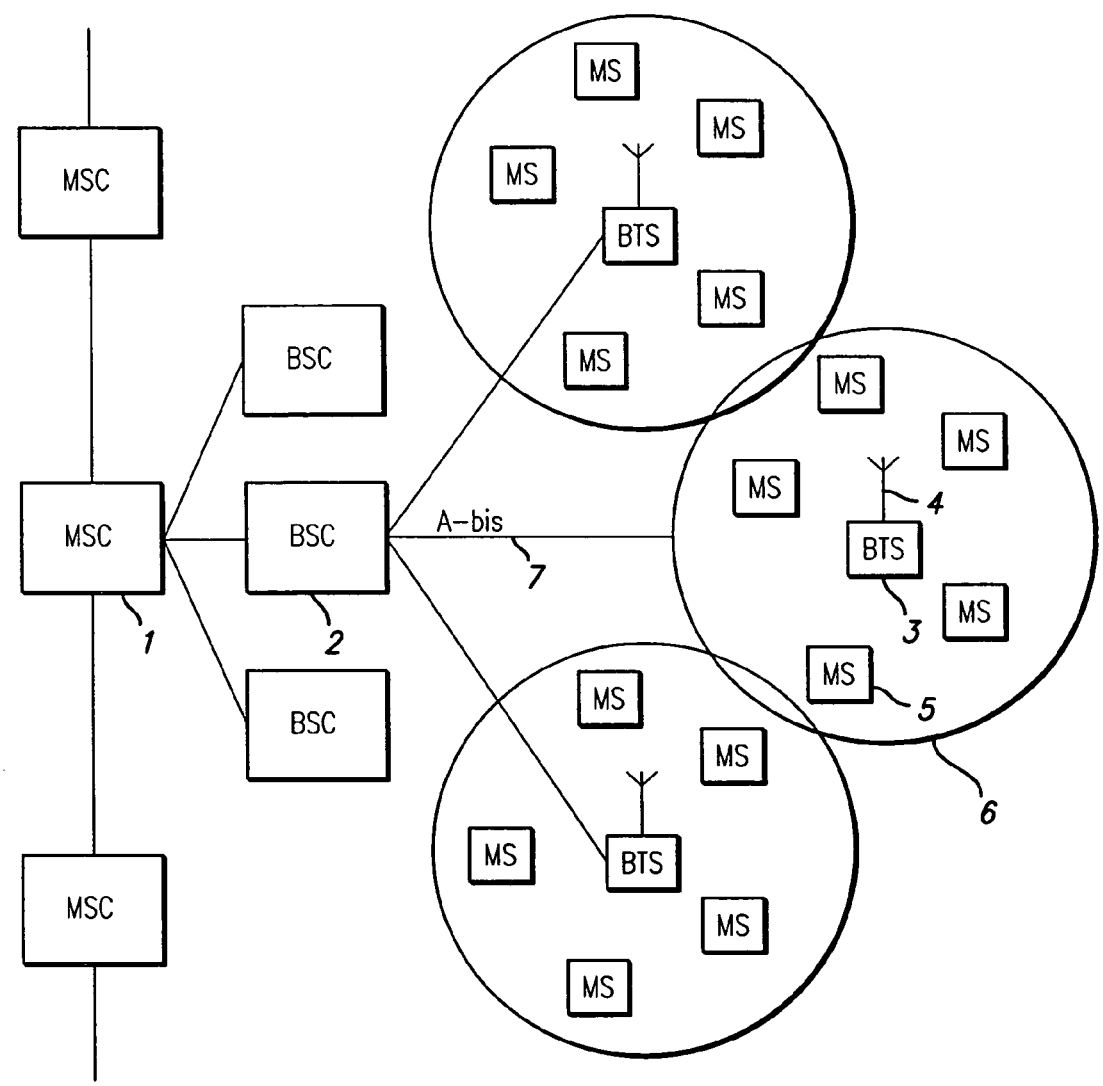
FIG. 1 illustrates a conventional wireless network.
Figure 2:
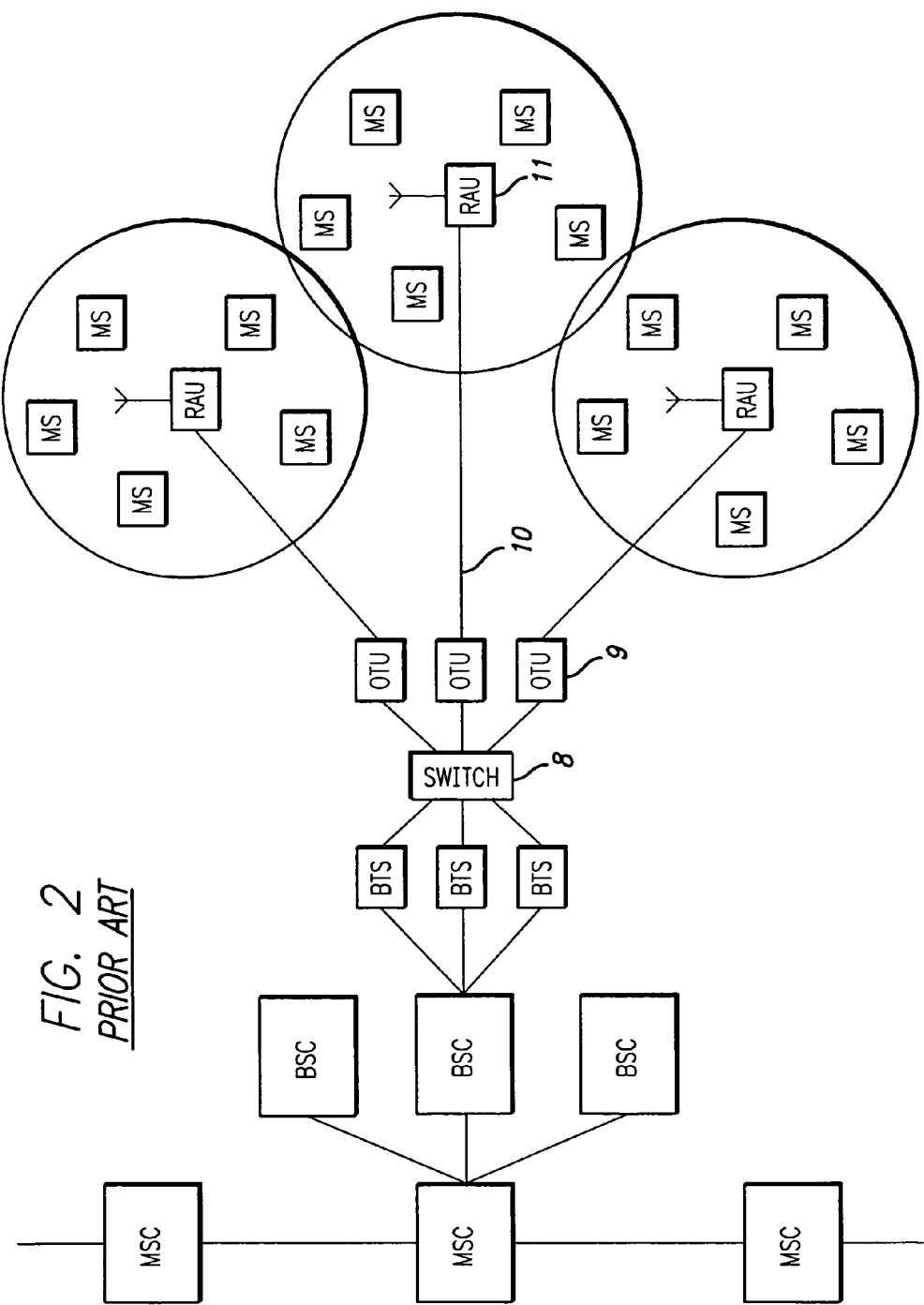
FIG. 2 illustrates another conventional wireless network.
Figure 3:
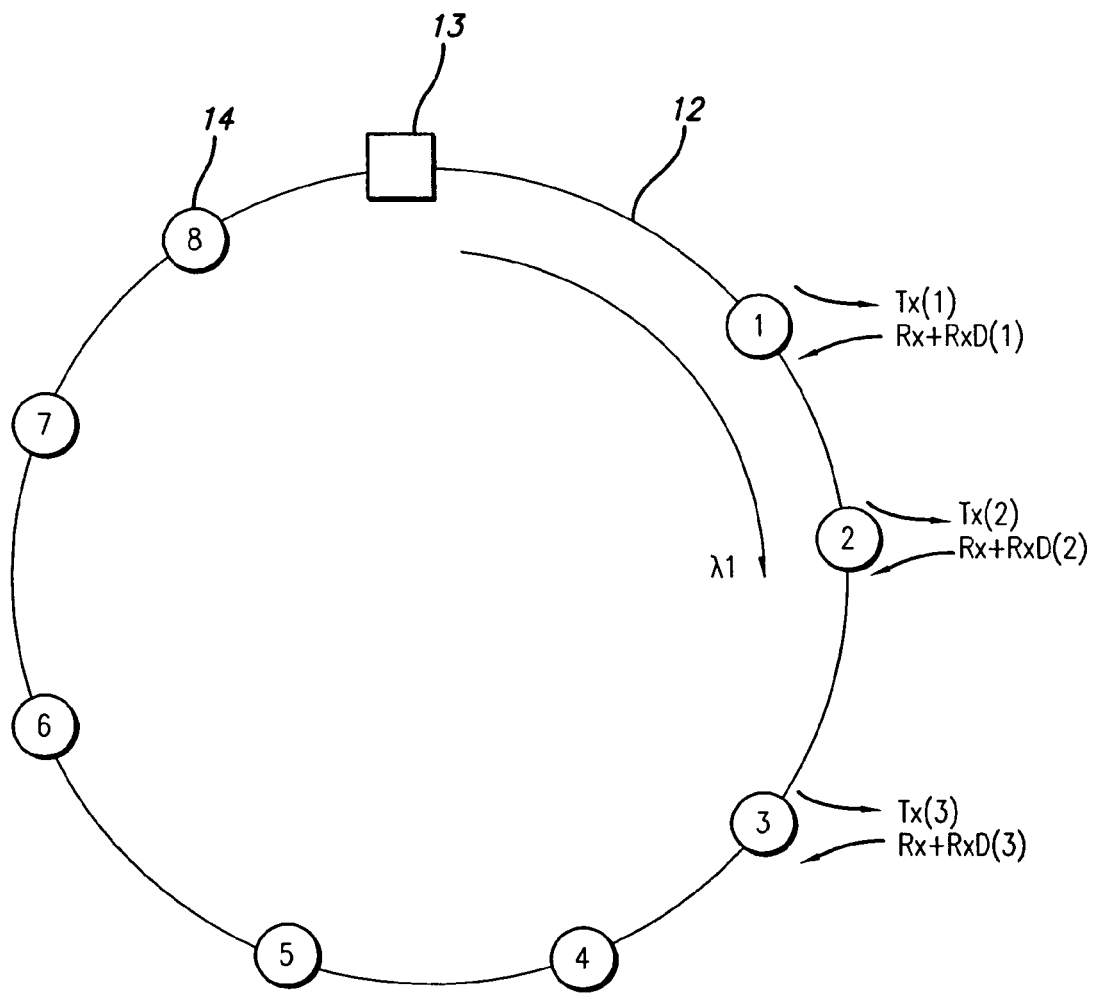
FIG. 3 illustrates an embodiment of the present invention with a plurality of nodes connected by a single fiber ring.
Figure 4:
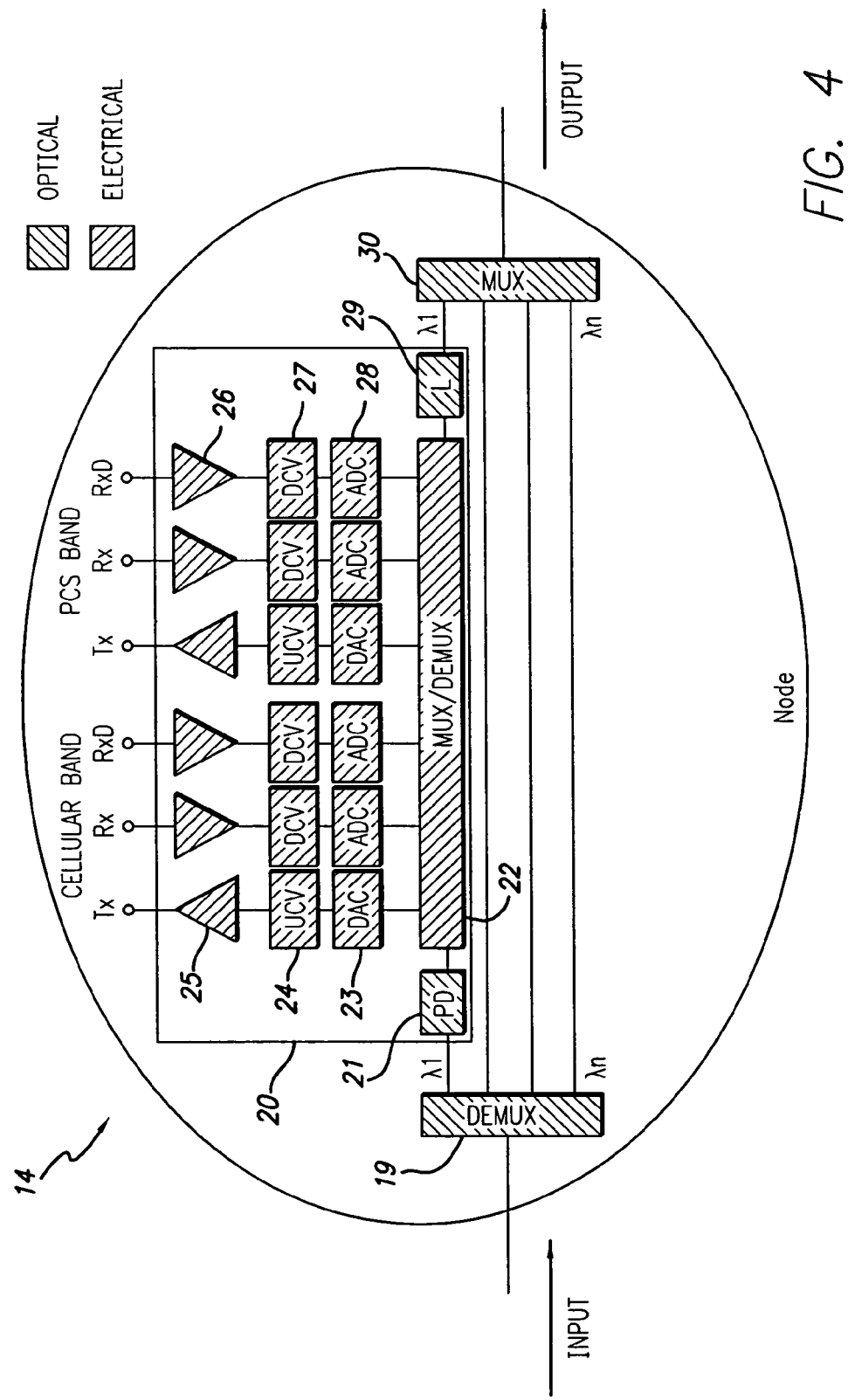
FIG. 4 provides a detailed view of one of the nodes in FIG. 3.

FIGS. 3 and 4 show one embodiment of the present invention, and the following discussion refers to both FIG. 3 and FIG. 4. FIG. 3 depicts a uni-directional single fiber ring 12 with one BTS hotel 13 and eight remote antenna nodes 14.

FIG. 4 illustrates in detail one of the nodes 14. In this example, the ring 12 is equipped for a single operator who uses wavelength 1 ($\lambda 1$). Furthermore, although ring 12 is shown as a ring in FIG. 3, it can be any shape as long as it remains a logical ring.

At each remote antenna node 14, the optical signals are optically demultiplexed by optical demultiplexer 19 and converted to the electrical domain using a photodiode 21, for electrical demultiplexing by the electrical multiplexer/demultiplexer (mux/demux) 22. The Tx signals are copied or extracted from the electrical multiplex and both Rx and RxD signals are added to the electrical multiplex. Note that the electrical mux/demux 22 operates on a time division basis (time division multiplex). The new electrical multiplex drives a laser 29 with wavelength $\lambda 1$ and all optical signals are multiplexed together for onward transmission to the following remote antenna node.

The optical demultiplexer 19 has n optical channels. n is chosen as a compromise between future expandability and initial cost. It should be noted that the present invention is not limited to optical demultiplexing and multiplexing in a single step as illustrated in FIG. 4. For example, the optical multiplexing and demultiplexing can be accomplished in a two-stage process, as illustrated in FIG. 5 for an 8-channel system by way of example. In this figure, the first stage demultiplexer 16 separates the input optical signal into low band (1290 nm to 1350 nm) and high band (1530 nm to 1590 nm). Each optical band is further demultiplexed into individual channels using standard 4-channel CWDM components 17 and 18. Only one 4-channel CWDM mux/demux pair is likely to be required for initial deployments; the second 4-channel mux/demux pair can be added as the system expands. Therefore the expense of equipping each node initially with an 8-channel mux/demux pair is avoided. Obviously, other combinations can be used up to the 16 channel limit imposed by the CWDM standard (ITU-T G.694.2). Although CWDM technology is described here by way of example, the same methodology may be adopted using DWDM.

The optically demultiplexed channels can either pass straight through the node or be processed by one or more remote modules in the node. Specifically, one or more optically demultiplexed channels can pass straight through to the CWDM multiplexer 30 (for example, as illustrated for $\lambda 2$ to $\lambda n$ in FIG. 4). This can occur, for example, where one or more operators (such as the operator who uses $\lambda n$) do not wish to provide service at that particular remote antenna node. If an operator (such as the operator using $\lambda 1$) wishes to provide service at a particular node, a remote module 20 is provided to process the optically demultiplexed channel. FIG. 4 only shows one remote module 20, but a node can have a plurality of remote modules.

Remote module 20 contains a photodiode 21 which converts the optical signals into the electrical domain. The resulting electrical signals are then demultiplexed by the electrical mux/demux 22, into their constituent electrical channels. The appropriate Tx or transmit channels required for that particular remote antenna node are selected and translated to RF via a DAC 23 and upconverter (UCV) 24. The RF signals are amplified to the required output power by power amplifiers (PA) 25. Each Tx channel has a separate DAC, UCV, PA chain. The output from the PA goes to the antenna system (not shown). The antenna system may comprise a separate Tx antenna or in some cases the Tx and Rx signals may be combined and fed to a single antenna using a duplexer. The antenna system may transmit to mobile units such as but not limited to mobile telephones.

The reverse link RF signals (Rx and RxD) entering the remote module 20 from the antenna system are amplified using low noise amplifiers (LNA) 26, frequency translated to IF using downconverters (DCV) 27 and converted to digital form using ADCs 28. The resulting digital electrical receive channels are multiplexed into the digital stream by the electrical mux/demux 22 and converted back into the optical domain by a laser 29. The wavelength of this laser 29 is chosen so that the optical channel number for that particular remote module is maintained. This optical channel is multiplexed with the other optical channels at the node (either from other remote modules or from straight through optical connections) by the optical multiplexer 30. In this way, each node in the ring extracts (copies) Tx signals and adds Rx and RxD signals to all active optical channels. The electrical multiplex therefore contains all of the Tx, Rx and RxD channels for all of the nodes on the ring for any particular operator (broadcast and select architecture). The optical multiplex contains these signals for all operators on a one-per-channel basis.

The selection of appropriate transmit signals at each of the nodes is a type of switching function, known as broadcast and select. Broadcast and select is a well known technique used for broadcast services such as television and radio but is not used in non-broadcast wireless signal distribution systems. The use of broadcast and select as a switching function is therefore one of the key aspects of the present invention that is unique to the method and system described here. Routing information (i.e. which signals are appropriate for radio transmission at any particular node) is typically contained within a control channel which is multiplexed into the digital electrical data stream.

The embodiment of FIGS. 3 and 4 can further include resilience to remote module failure. An example of how this resilience is implemented is shown in FIG. 6. An active wavelength comes into the remote antenna node and is demultiplexed by the optical demultiplexer such as demultiplexer 19 in FIG. 4. Instead of being directly connected to the remote module 20, it enters a 2-way optical switch 31. Under normal circumstances, this switch and its partner 32 are connected to the remote module. However under fault conditions within the remote module 20, the switches are set to by-pass mode, where a straight-through optical cable 33 is connected. This is done in a fail-safe manner, i.e. the switches are non-latching and move to by-pass mode on power failure. In this way, a fault in one remote module does not affect all of the other remote modules on the ring with that particular wavelength.

In the embodiment of FIGS. 3 and 4, the optical transmission links such as 12 between nodes are digital. These digital optical transmission links should preferably be fast enough to support all of the traffic for one operator. If the required transmission rate for a particular operator exceeds what is available from commonly-used digital transmission systems, then it may be necessary to assign another optical channel to that operator. As an estimate of an exemplary required transmission rate, assume that each node must support 4 GSM carriers and 1 UMTS carrier. This requires a total bandwidth of 17.4 MHz for Tx, Rx and RxD signals (3×(4×0.2+5)). Further assume that analog to digital conversion requires approximately 40 bits per second per Hz of bandwidth. Total transmission rate required per node is therefore approximately 700 Mb/s. Up to 13 nodes can therefore be supported per operator-wavelength using readily-available 10 Gb/s digital transmission technology such as SONET OC-192 or 10 Gigabit Ethernet.

Figure 7:
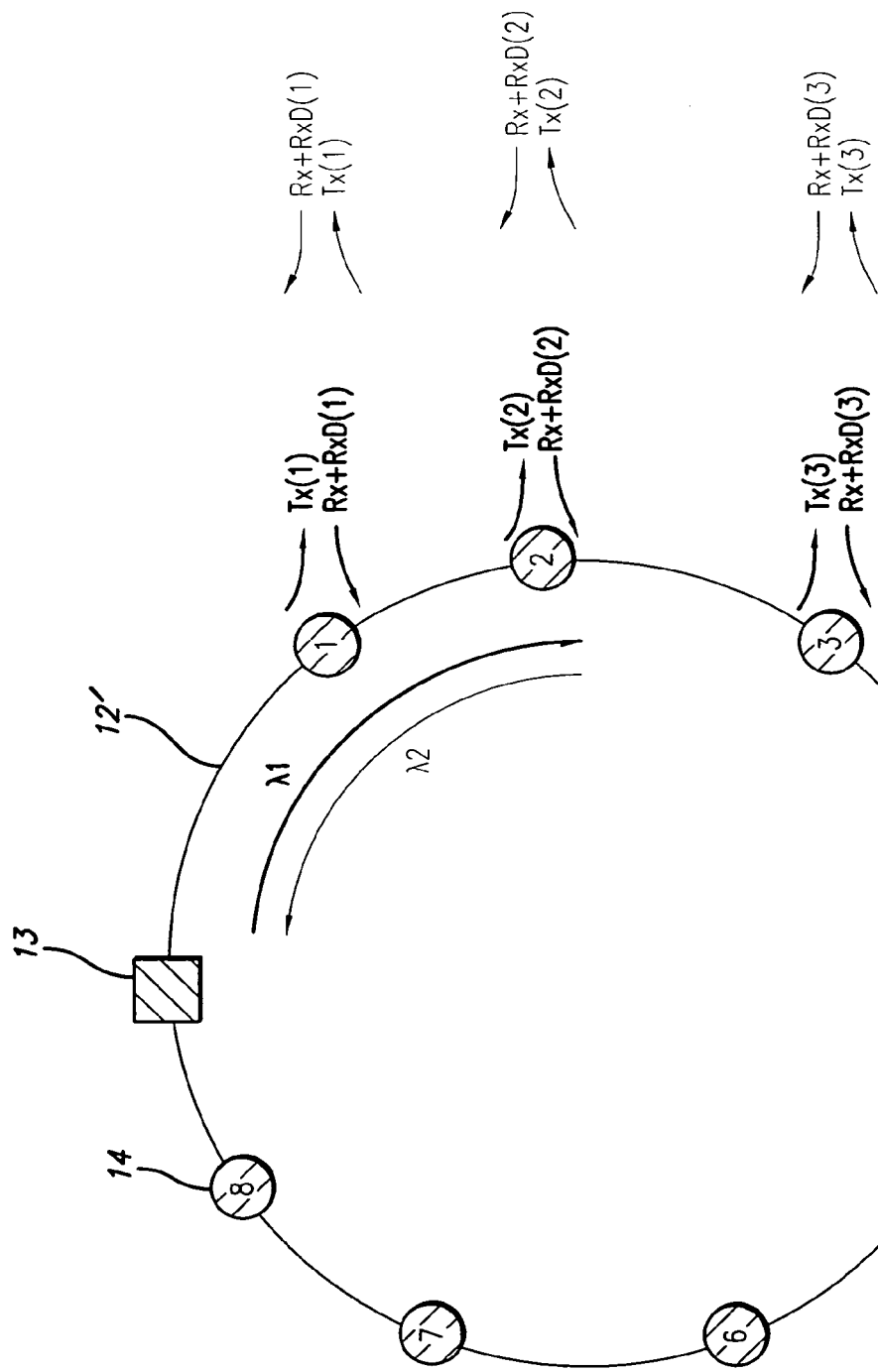
FIG. 7 illustrates another embodiment of the present invention with a plurality of nodes connected by a single fiber ring.
Figure 8:
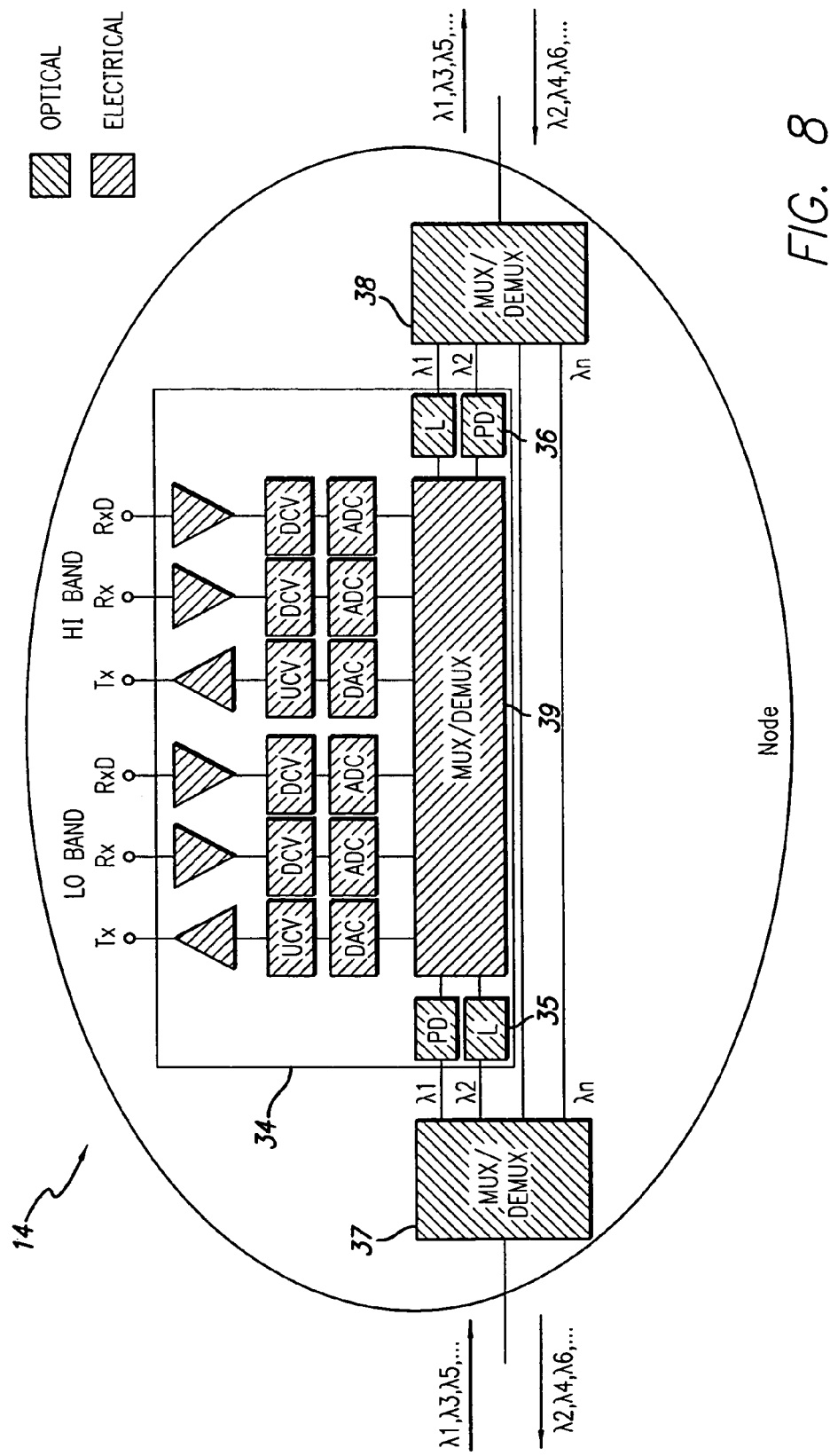
FIG. 8 provides a detailed view of one of the nodes in FIG. 7.

FIGS. 7 and 8 illustrate another embodiment of the present invention. Like numbers in FIGS. 7 and 8 with FIGS. 3 and 4 refer to the same elements, and discussion of similar elements (whether or not having a reference numeral in FIGS. 7 and 8) is not repeated.

FIG. 7 shows a bi-directional single fiber ring configuration 12', again with one BTS hotel 13 and eight remote antenna nodes 14. Each node 14 passes two optical wavelengths, such as λ1 and λ2, in opposing directions (in this arrangement each operator would have a wavelength pair). Each optical wavelength carries the total Tx traffic for all of the nodes. Furthermore, each optical wavelength carries all of the Rx and RxD traffic that has been accumulated at any particular point of the ring 12', so that each carries the total Rx and RxD traffic by the time it gets back to the BTS hotel 13. This provides built-in redundancy, since the same signals are available at the BTS hotel 13 from both directions. In this embodiment therefore, a break at any point in the ring does not lead to catastrophic loss of signal.

The embodiment of FIGS. 7 and 8 also provides two signal delay-related options. If the Rx and RxD signals chosen at the BTS hotel 13 come from the opposing transmission direction to the Tx signals, then there will be no differential delay between them. The second option is where the Rx and RxD signals are chosen at the BTS hotel 13 to be from the same direction as the Tx signals. In this case, there will be a constant round-trip delay from each node on the ring 12'. The preferred option can be chosen on a per-protocol basis and will depend on whether zero Tx/Rx differential delay or constant round-trip delay is more important to stable system operation for any particular protocol.

If differential transmission delay between Tx and Rx (and RxD) proves to be a problem for any particular protocol, either for the bi-directional ring 12' or the uni-directional ring 12 described previously, then the electrical mux/demux circuits could contain data buffers. These would serve to add delay to the shorter of the signal paths, thereby equalizing transmission delay.

FIG. 8 shows the layout of a remote antenna node 14 in FIG. 7 in more detail. Wavelength λ1 operates as described previously. Wavelength λ2 travels around the ring in the opposite direction. The remote module 34 contains an additional laser 35 and photodiode 36. The CWDM components at the input 37 and output 38 of the node are optical multiplexers and demultiplexers. The electrical mux/demux 39 processes bi-directional digital signal flows.

In the above embodiments in FIGS. 3 and 4 and FIGS. 7 and 8, all nodes except the BTS hotel 13 are represented as remote antenna nodes 14. However, the present invention is not limited to such an arrangement. The nodes may be any combination of remote antenna nodes, BTS hotels, points where backhaul links to the core network enter the ring or macrocell sites (where BTSs or backhaul links may be connected to the ring).

Figure 9:
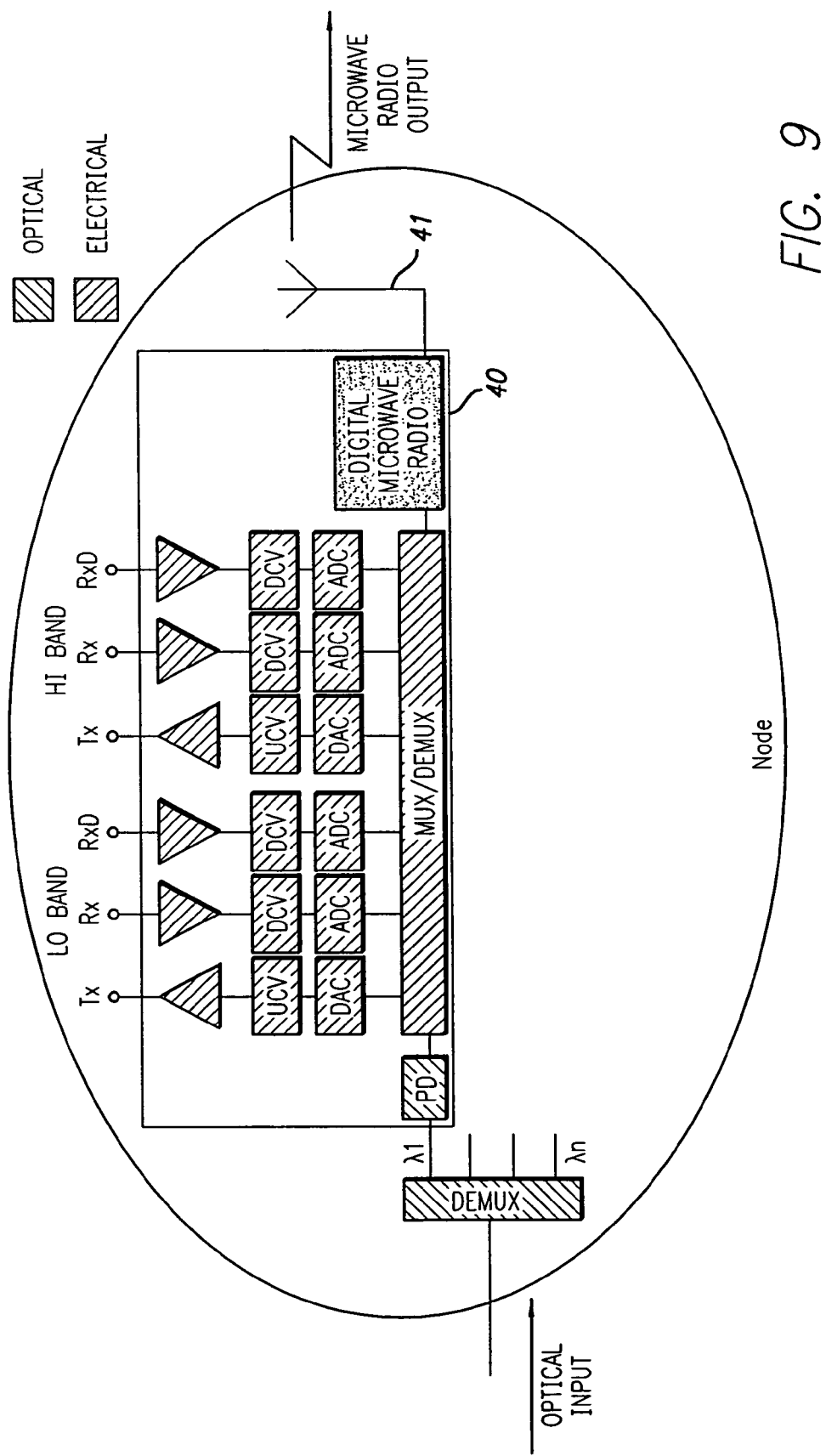
FIGS. 9-11 illustrate different nodes of the present invention.

In the above embodiments in FIGS. 3 and 4 and FIGS. 7 and 8, all the links in the ring 12 or 12' use optical fiber. However, the present invention is not limited to such an arrangement. The links may include other transmission media such as free-space optics or microwave radio. The node in one such embodiment is illustrated in FIG. 9. Discussion of similar elements to the nodes in FIGS. 4 and 8 is not repeated. The node in FIG. 9 is in a uni-directional ring with a microwave radio output 40 transmitted to the following node via an antenna 41. This digital microwave radio will typically be a commercially-available transmission link, possibly using a millimetre-wave frequency band. In most cases only active channels would be transmitted in this manner for reasons of cost. Thus, the transmission ring may have one transmission media between a node and a following node and a second, different transmission media between the following node and a further node on the ring.

It should be noted that the present invention is not limited to linking nodes by the optical fiber as illustrated in FIG. 4 or even a mixture of optical fiber and microwave radio as illustrated in FIG. 9. The nodes, for example, may be linked such that all of the links use either free-space optical or microwave radio transmission. For the case of a ring using only microwave radio transmission links, the first stage multiplexing and demultiplexing would use frequency division multiplexing (FDM) rather than the wavelength division multiplexing described here. In this arrangement, each microwave radio would operate at a particular carrier frequency to avoid interference with other microwave radios using the same transmission path.

The BTSs, such as BTS 13 in FIGS. 3 and 7, have analog RF outputs. However, the present invention is not limited to such BTSs. For example, there are initiatives presently under development that separate the baseband digital parts of a BTS from the analog radio parts, thereby exposing a standardized digital interface. These initiatives are the common public radio interface (CPRI) and the open base station architecture initiative (OBSAI). It is likely that these "digital" base stations will be deployed in the next few years.

Figure 10:
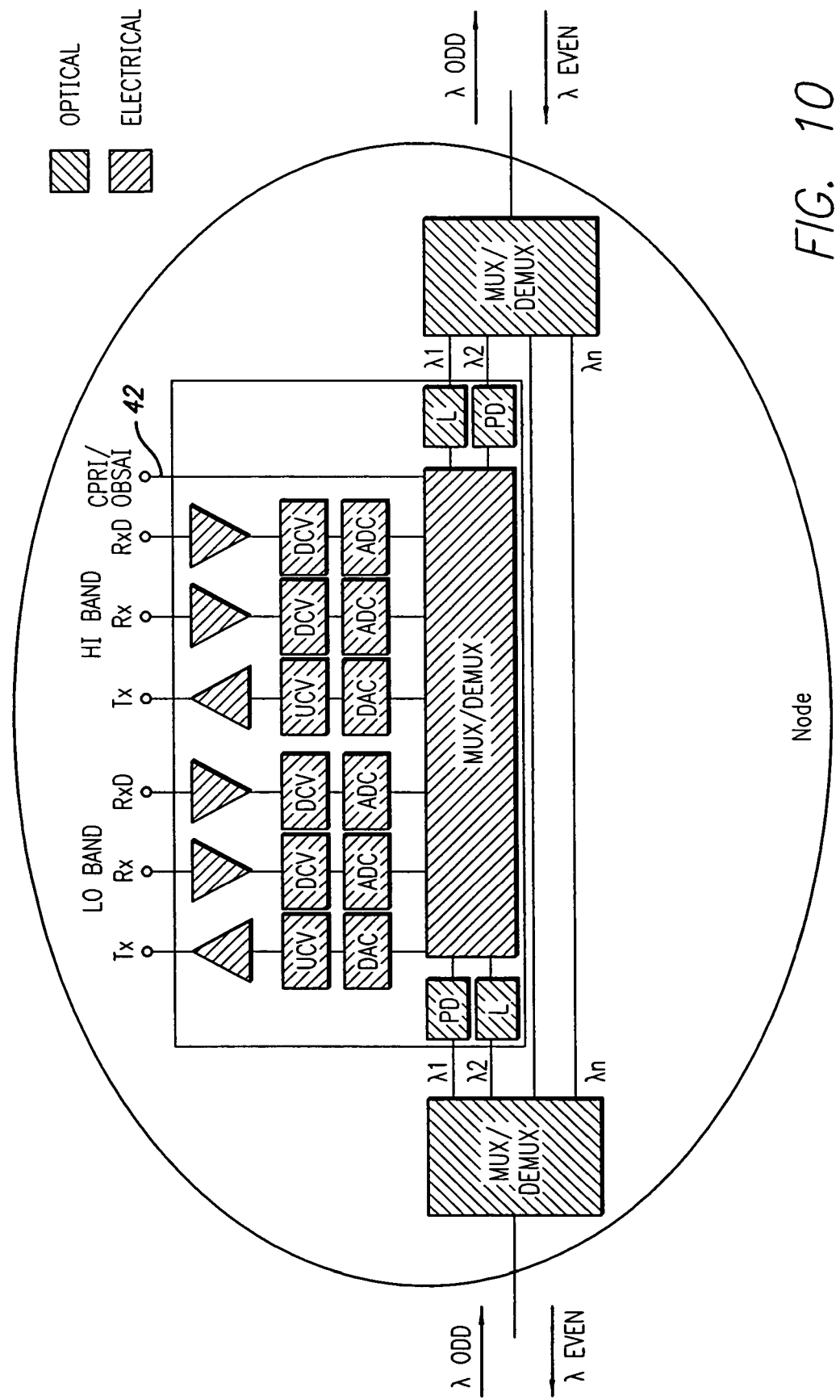

The present invention can support such digital base stations. FIG. 10 illustrates a node in an embodiment that utilizes digital base stations. Discussion of similar elements to the nodes in FIGS. 4, 8 and 9 is not repeated. The node is in a bi-directional ring. The baseband digital output from a CPRI or OBSAI BTS is multiplexed into the electrical data streams that circulate round the ring and selected or added at appropriate nodes. The electrical mux/demux therefore presents an appropriate CPRI or OBSAI interface 42 at the output of the remote module for connection of a standard remote radio head.

Figure 11:
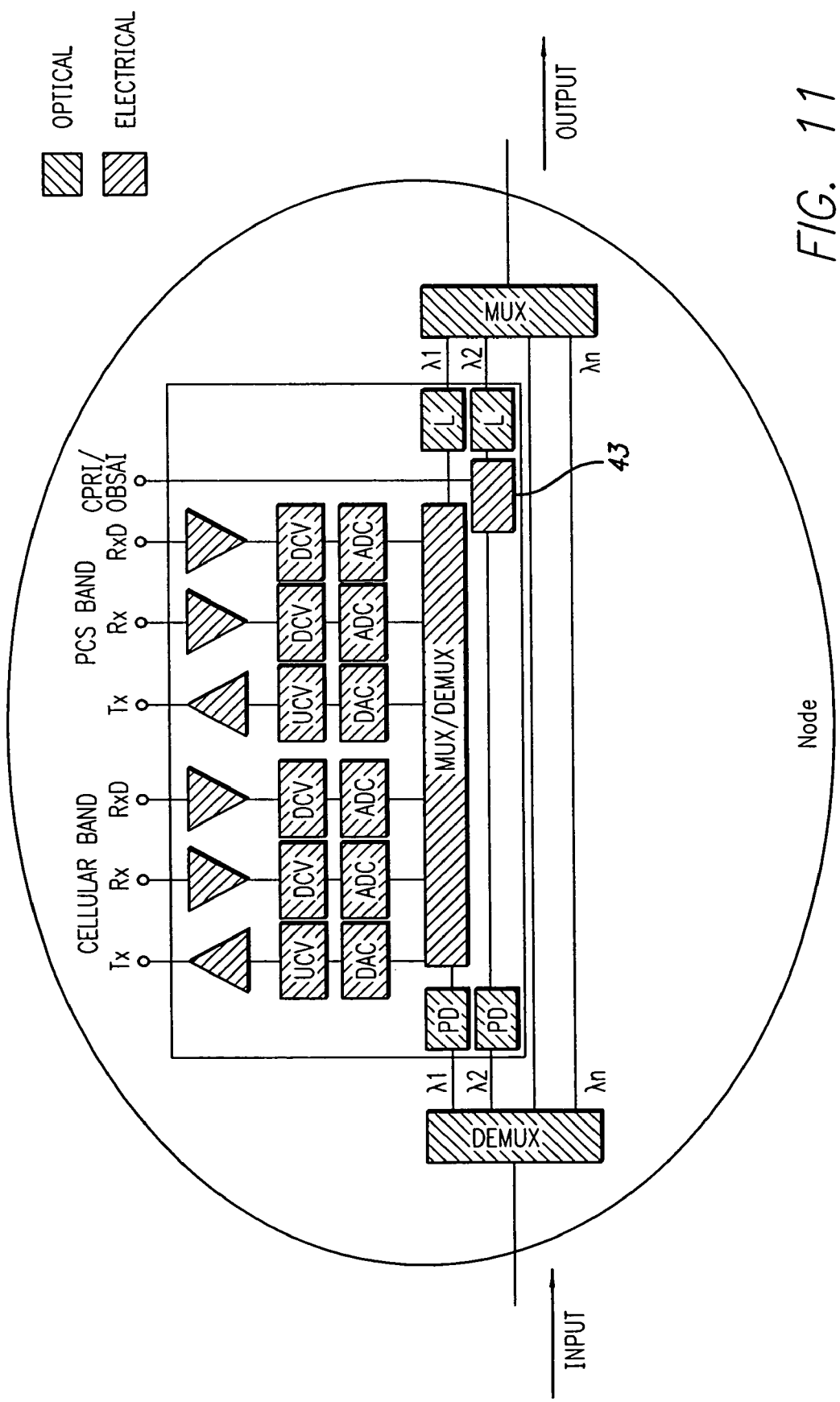

An alternative embodiment is shown in FIG. 11 for the case of a uni-directional ring. Discussion of similar elements to the nodes in FIGS. 4, 8, 9 and 10 is not repeated. In FIG. 11, the CPRI/OBSAI data streams are carried on a separate optical wavelength λ2 and presented as an output of the remote module via an interface unit 43.

Figure 12:
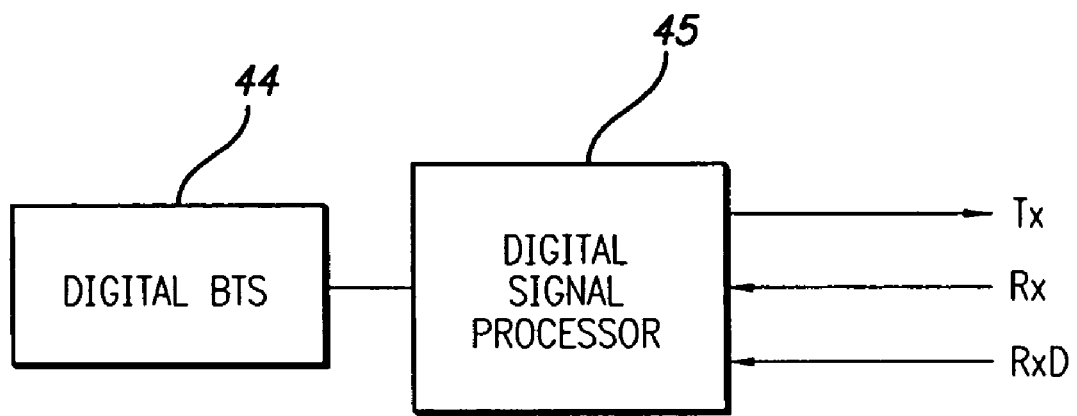
FIG. 12 illustrates an embodiment of the present invention that supports digital BTSs.

Another embodiment that supports digital BTSs is shown in FIG. 12. The output of a digital BTS 44 is converted to the same format as the digitized RF from the traditional analog BTSs using a digital signal processor 45. These signals are transported round the ring in exactly the same way as the signals from the analog BTSs.

It should be noted that other digital information and data may be multiplexed within the digital electrical data stream that passes around the ring. For example, data signals for wireless local area network (e.g. WiFi) or wireless access network (e.g. WiMax) protocols may be added. An appropriate physical layer interface port, such as Ethernet, would then be presented at the output of the remote modules so that standard WiFi or WiMax access points could be deployed at the remote antenna nodes. In fact any equipment that uses a standard digital interface such as Ethernet (for example closed circuit television cameras) could be deployed at the remote antenna nodes by this means.

While the present invention has been described in the context of an apparatus, the present invention also includes a communications method. In one embodiment, a method is performed to execute the present invention. The method comprises providing a node on a transmission ring. The node, for example, may have the structure of any of the nodes illustrated in FIGS. 4 and 8-11. The node receives an optical signal. The signal may be sent by another node on the transmission ring, such as a BTS. Once the signal is received, the node demultiplexes the optical signal into a plurality of optical channels. This can be done by a demultiplexer, such as the demultiplexer 19 in FIG. 4 and the demultiplexer 37 in FIG. 8.

At least one of the optical channels is converted to an electrical signal by, for example, a photodiode. The electrical signal is demultiplexed to a plurality of digital electrical channels. Such demultiplexing can be achieved by an electrical multiplexer/demultiplexer such as the electrical multiplexer/demultiplexer 22 in FIG. 4. The appropriate transmit channels are converted to output analog radio frequency signal. This can be done through an arrangement employing a digital-to-analog converter 23 and upconverter 24 as in FIG. 4.

Any input analog radio frequency signals received by the remote module is converted to a digital electrical receive signal. This can be done through an arrangement employing a downconverter 27 and an analog-to-digital converter 28 as in FIG. 4. The digital electrical receive signal is multiplexed with other digital electrical channels. The resulting multiplexed signal is converted to the optical channel by, for example, a laser. The optical channel is multiplexed with other optical channels onto an optical signal for transmission to a further node on the transmission ring.

It should be noted that each node of the communications method can either be a remote antenna node, a base station hotel, a backhaul connection point or a macro base station site such the transmission ring can have a variety of different types of nodes or identical nodes. It should also be noted that the transmission between the nodes can be through a variety of transmission media as discussed above.

The communications method may further include the demultiplexing of the optical signal into two signals and demultiplexing each of the two signals into a plurality of optical channels. This step has many benefits as discussed above with respect to FIG. 5. The communications method may further include transmitting certain optical channels directly from the optical demultiplexer to the optical multiplexer.

The communications method may provide for resilience. A path is provided between the optical multiplexer and the optical multiplexer. The method further includes providing a switch in the path. The node controls the switch such that the switch can direct the optical channel to the path in the event the remote module fails. This method has many benefits as discussed with respect to FIG. 6.

The communications method may provide a remote module with a digital interface. The digital interface can be used to receive and transmit a digital electrical channel or channels from digital base station as discussed with respect to FIG. 10. The digital interface can be an interface for digital transmission systems such as Ethernet. The method can further provide that signals from analog and digital base stations are transported around the ring on separate optical channels as discussed with respect to FIG. 11. The method can further provide converting the output of a digital base station to the same format as the digitized RF from the analog base stations using a digital signal processor as described with respect to FIG. 12.

The communications method can employ the broadcast and select communications method. In the broadcast and select method, the optical signal carries transmit signals for all the plurality of nodes in the transmission ring. At each node, the appropriate transmit channels are selected for transmission by the node. Any signals received by the node are added to the optical signal (such as in the manner discussed above with respect to FIG. 4 above). The optical signal is then transmitted to the next node.

In another embodiment, a communications method can be performed using a bi-directional approach as, for example, illustrated in FIG. 7. In this method, two signals are transmitted along the ring as discussed above. The signals may be transmitted in the same direction (e.g., both clockwise) or in opposite directions.

Although the present invention has been fully described in connection with the embodiments thereof and with reference to the accompanying drawings, it is to be noted that various changes and modifications will become apparent to those skilled in the art. Such changes and modifications are to be understood as being included within the scope of the present invention as defined by the claims.

What is claimed is:

1. A wireless signal distribution system comprising:
   a transmission ring in communication with a base station hotel which provides at least a digital output and an analog output from at least one base station of the base station hotel, the at least one base station comprises a digital base station which provides at least the digital output; and
   a plurality of nodes arranged in the transmission ring, and not co-located with one another, such that at least one optical signal is transmitted from node to node along the transmission ring, at least one particular node of the plurality of nodes comprising:
      an optical demultiplexer to demultiplex the optical signal received at the particular node from a previous node in the transmission ring into a plurality of optical channels;
      at least one optical multiplexer to multiplex the plurality of optical channels for transmission to a following node in the transmission ring via a transmission media, the following node differs from the previous node; and
      at least one remote module, remote from the base station hotel, comprising:
         a photodiode to convert a first optical channel from the plurality of optical channels to an electrical signal, the first optical channel is selected from among the plurality of optical channels based on routing information in the at least one optical signal, the routing information indicating which optical channels of the plurality of optical channels are for use by which nodes;
         an electrical multiplexer/demultiplexer to demultiplex the electrical signal to a plurality of digital electrical channels, including at least one digital electrical channel which is a transmit channel and at least one digital electrical channel which includes the digital output, and to multiplex digital electrical channels,
         at least one converter to convert the transmit channel to an output analog radio frequency signal for transmission via an antenna and to convert at least one input analog radio frequency signal from an antenna to at least one digital electrical receive channel to be multiplexed by the electrical multiplexer/demultiplexer onto a multiplexed electrical signal, and
         a laser for converting the multiplexed electrical signal to the first optical channel, to be multiplexed by the at least one optical multiplexer for transmission to the following node; wherein:
            the electrical multiplexer/demultiplexer provides a digital interface to a radio head by providing the at least one digital electrical channel which includes the digital output to the radio head;
            the digital interface to the radio head transmits at least one digital electrical channel to the digital base station;
            the digital base station includes a digital interface for communicating with the digital interface to the radio head; and
            the electrical multiplexer/demultiplexer multiplexes the at least one digital electrical channel which includes the digital output onto the multiplexed electrical signal such that the multiplexed electrical signal contains a digital channel of the digital base station and an analog channel.

2. The wireless signal distribution system of claim 1 wherein the particular node is a remote antenna node.

3. The wireless signal distribution system of claim 1 wherein the at least one converter comprises a downconverter to convert the input analog radio frequency signal to an analog intermediate frequency signal and an analog-to-digital converter to convert the analog intermediate frequency signal to the digital electrical receive channel.

4. The wireless signal distribution system of claim 3 wherein the at least one converter further comprises a digital-to-analog converter to convert the transmit channel to an analog intermediate frequency signal and a upconverter to convert the analog intermediate frequency signal to the output analog radio frequency signal.

5. The wireless signal distribution system of claim 1 wherein the optical signal is transmitted unidirectionally in a first direction from node to node along the transmission ring, including unidirectionally from the previous node to the particular node and from the particular node to the following node, such that the optical signal carries all transmission channels for the plurality of nodes and all receive channels accumulated from the plurality of nodes.

6. The wireless signal distribution system of claim 5, wherein an additional optical signal is transmitted unidirectionally, opposite the first direction, from node to node along the transmission ring, such that the additional optical signal carries all the transmission channels for the plurality of nodes and all receive channels accumulated from the plurality of nodes.

7. The wireless signal distribution system of claim 1 wherein the optical demultiplexer demultiplexes the optical signal into two signals and demultiplexes each of the two signals into a plurality of optical channels.

8. The wireless signal distribution system of claim 1 wherein the first optical channel is used by a wireless network operator which provides service at the at least one remote module, and remaining optical channels of the plurality of optical channels are input directly to the at least one optical multiplexer after being output from the optical demultiplexer, without being processed by the at least one remote module.

9. The wireless signal distribution system of claim 1 wherein the particular node further comprises a path between the optical demultiplexer and the at least one optical multiplexer and a switch in the path, said switch directing the first optical channel to the path in the event the remote module fails.

10. The wireless signal distribution system of claim 1, wherein the digital interface to the radio head is an Ethernet interface for receiving and transmitting digital data.

11. The wireless signal distribution system of claim 1 wherein the base station hotel comprises an analog base station, which provides an analog output, the optical signal comprises at least one optical channel from the analog output of the analog base station and at least one optical channel from the digital output of the digital base station, the analog and digital outputs are provided to mobile stations via the optical signal.

12. The wireless signal distribution system of claim 11 wherein the digital output of the digital base station is converted by a digital signal processor and multiplexed with the analog output of the analog base station.

13. The wireless signal distribution system of claim 1, wherein:
the particular node comprises a plurality of remote modules, each remote module processes a respective optically demultiplexed channel from the optical demultiplexer.

14. The wireless signal distribution system of claim 13, wherein:
the remote modules at the particular node are used by different respective wireless network operators.

15. The wireless signal distribution system of claim 1, wherein:
the digital base station provides both the digital output and an analog output, the digital output is a digital baseband output.

16. The wireless signal distribution system of claim 1, wherein:
the base station hotel comprises an analog base station, which provides an analog output, the analog channel is from the analog base station.

17. The wireless signal distribution system of claim 16, wherein:
the base station hotel comprises co-located base stations of different wireless network operators, and different nodes of the plurality of nodes are used by the different wireless network operators.

18. A wireless signal distribution system, comprising:
a transmission ring in communication with a base station hotel which provides at least a digital output and an analog output from at least one base station of the base station hotel, the at least one base station comprises a digital base station which provides at least the digital output; and
a plurality of nodes arranged in the transmission ring, and not co-located with one another, such that at least one optical signal is transmitted from node to node along the transmission ring, at least one particular node of the plurality of nodes comprising:
an optical demultiplexer to demultiplex the optical signal received at the particular node from a previous node in the transmission ring into a plurality of optical channels;
at least one optical multiplexer to multiplex the plurality of optical channels for transmission to a following node in the transmission ring via a transmission media, the following node differs from the previous node; and
at least one remote module, remote from the base station hotel, comprising:
a photodiode to convert a first optical channel from the plurality of optical channels to an electrical signal, the first optical channel is selected from among the plurality of optical channels based on routing information in the at least one optical signal, the routing information indicating which optical channels of the plurality of optical channels are for use by which nodes;
an electrical multiplexer/demultiplexer to demultiplex the electrical signal to a plurality of digital electrical channels, including at least one digital electrical channel which is a transmit channel and at least one digital electrical channel which includes the digital output, and to multiplex digital electrical channels,
at least one converter to convert the transmit channel to an output analog radio frequency signal for transmission via an antenna and to convert at least one input analog radio frequency signal from an antenna to at least one digital electrical receive channel to be multiplexed by the electrical multiplexer/demultiplexer onto a multiplexed electrical signal, and
a laser for converting the multiplexed electrical signal to the first optical channel, to be multiplexed by the at least one optical multiplexer for transmission to the following node; wherein:
the electrical multiplexer/demultiplexer provides a digital interface to a radio head by providing the at least one digital electrical channel which includes the digital output to the radio head;
the digital interface to the radio head transmits at least one digital electrical channel to the digital base station;
the digital base station includes a digital interface for communicating with the digital interface to the radio head; and
the at least one digital electrical channel which includes the digital output of the digital base station is converted to a second optical channel, and the first optical channel and the second optical channel are multiplexed by the at least one optical multiplexer.

19. The wireless signal distribution system of claim 18, wherein:
the digital base station provides both the digital output and an analog output, the digital output is a digital baseband output.

20. The wireless signal distribution system of claim 18, wherein the base station hotel comprises an analog base station, which provides an analog output.

21. The wireless signal distribution system of claim 20, wherein:
the base station hotel comprises co-located base stations of different wireless network operators, and different nodes of the plurality of nodes are used by the different wireless network operators.

22. A wireless signal distribution system, comprising:
a transmission ring in communication with a base station hotel which includes base stations of different wireless network operators, the base stations are co-located in the base station hotel; and
a plurality of nodes arranged in the transmission ring, and not co-located with one another, such that at least one optical signal is transmitted from node to node along the transmission ring, different nodes of the plurality of nodes are used by different wireless network operators, at least one particular node of the plurality of nodes comprising:
an optical demultiplexer to demultiplex the optical signal received at the particular node from a previous node in the transmission ring into a plurality of optical channels;
an optical multiplexer to multiplex the plurality of optical channels for transmission to a following node in the transmission ring via a transmission media, the following node differs from the previous node; and
at least one remote module, remote from the base station hotel, comprising:

a photodiode to convert an optical channel from the plurality of optical channels to an electrical signal, the optical channel which is converted is selected from among the plurality of optical channels based on routing information in the at least one optical signal, the routing information indicating which optical channels of the plurality of optical channels are for use by which nodes;

an electrical multiplexer/demultiplexer to demultiplex the electrical signal to a plurality of digital electrical channels, at least one digital electrical channel being a transmit channel, and to multiplex digital electrical channels, at least one converter to convert the transmit channel to an output analog radio frequency signal for transmission via an antenna and to convert at least one input analog radio frequency signal from an antenna to at least one digital electrical receive channel to be multiplexed by the electrical multiplexer/demultiplexer onto a multiplexed electrical signal, and a laser for converting the multiplexed electrical signal to the optical channel to be multiplexed by the optical multiplexer for transmission to the following node; wherein:

the electrical multiplexer/demultiplexer provides a digital interface to a remote radio head, the electrical signal includes a digital baseband part which is provided via the digital interface;

the at least one remote module further comprises a digital interface which receives the at least one digital electrical channel from a digital base station, and transmits at least one digital electrical channel to the digital base station, the digital base station includes a digital interface for communicating with the digital interface of the remote module; and the digital electrical channel received from the digital base station is multiplexed by the electrical multiplexer/demultiplexer onto the multiplexed electrical signal such that the multiplexed electrical signal contains channels from an analog base station and the digital base station.

23. A wireless signal distribution system, comprising:

a transmission ring in communication with a base station hotel which includes base stations of different wireless network operators, the base stations are co-located in the base station hotel; and a plurality of nodes arranged in the transmission ring, and not co-located with one another, such that at least one optical signal is transmitted from node to node along the transmission ring, different nodes of the plurality of nodes are used by different wireless network operators, at least one particular node of the plurality of nodes comprising:

an optical demultiplexer to demultiplex the optical signal received at the particular node from a previous node in the transmission ring into a plurality of optical channels;

an optical multiplexer to multiplex the plurality of optical channels for transmission to a following node in the transmission ring via a transmission media, the following node differs from the previous node; and at least one remote module, remote from the base station hotel, comprising:

a photodiode to convert an optical channel from the plurality of optical channels to an electrical signal, the optical channel which is converted is selected from among the plurality of optical channels based on routing information in the at least one optical signal, the routing information indicating which optical channels of the plurality of optical channels are for use by which nodes;

an electrical multiplexer/demultiplexer to demultiplex the electrical signal to a plurality of digital electrical channels, at least one digital electrical channel being a transmit channel, and to multiplex digital electrical channels, at least one converter to convert the transmit channel to an output analog radio frequency signal for transmission via an antenna and to convert at least one input analog radio frequency signal from an antenna to at least one digital electrical receive channel to be multiplexed by the electrical multiplexer/demultiplexer onto a multiplexed electrical signal, and a laser for converting the multiplexed electrical signal to the optical channel to be multiplexed by the optical multiplexer for transmission to the following node; wherein:

the electrical multiplexer/demultiplexer provides a digital interface to a remote radio head, the electrical signal includes a digital baseband part which is provided via the digital interface;

the at least one remote module further comprises a digital interface which receives the at least one digital electrical channel from a digital base station, and transmits at least one digital electrical channel to the digital base station, the digital base station includes a digital interface for communicating with the digital interface of the remote module; and the digital electrical channel received from the digital base station is converted to a second optical channel and the optical channel and the second optical channel are multiplexed by the optical multiplexer.

* * * * *